(12) United States Patent
Asher et al.

(10) Patent No.: US 7,945,479 B2
(45) Date of Patent: May 17, 2011

(54) ORDERING SYSTEM AND METHOD FOR PIZZA AND OTHER GOODS AND SERVICES USING A STATELESS COMMUNICATION PROTOCOL

(75) Inventors: Marc Asher, Highland Park, IL (US); James Kargman, Chicago, IL (US); Jay Eagle, Homewood, IL (US)

(73) Assignee: IPDEV Co., Chicago, IL (US)

( * ) Notice: Subject to any disclaimer, the term of this patent is extended or adjusted under 35 U.S.C. 154(b) by 1200 days.

(21) Appl. No.: 11/594,675

(22) Filed: Nov. 8, 2006

(65) Prior Publication Data

US 2007/0106568 A1   May 10, 2007

Related U.S. Application Data (60) Provisional application No. 60/734,742, filed on Nov. 8, 2005, provisional application No. 60/816,265, filed on Jun. 22, 2006, provisional application No. 60/841,995, filed on Aug. 31, 2006, provisional application No. 60/845,156, filed on Sep. 15, 2006.

(51) Int. Cl.
 *G06Q 30/00* (2006.01)
(52) U.S. Cl. ............................................ 705/26; 705/37
(58) Field of Classification Search .................. 705/26, 705/37
See application file for complete search history.

(56) References Cited

U.S. PATENT DOCUMENTS

| | | | |
|---|---|---|---|
| 5,557,518 A | 9/1996 | Rosen | |
| 5,790,677 A | 8/1998 | Fox et al. | |
| 5,903,878 A | 5/1999 | Talati et al. | |
| 6,332,134 B1 | 12/2001 | Foster | |
| 6,820,199 B2 | 11/2004 | Wheeler et al. | |
| 6,836,765 B1 | 12/2004 | Sussman | |
| 6,877,093 B1 | 4/2005 | Desai et al. | |
| 6,892,300 B2 | 5/2005 | Carroll et al. | |
| 6,904,418 B2 | 6/2005 | Walker et al. | |
| 6,915,279 B2 | 7/2005 | Hogan et al. | |
| 2002/0038259 A1 | 3/2002 | Bergman et al. | |
| 2002/0038261 A1 | 3/2002 | Kargman et al. | |
| 2002/0194501 A1 | 12/2002 | Wenocur et al. | |
| 2004/0210621 A1 | 10/2004 | Antonellis | |
| 2005/0009511 A1 | 1/2005 | Bostrom et al. | |
| 2007/0061328 A1* | 3/2007 | Ramer et al. ............... | 707/10 |

OTHER PUBLICATIONS

Domino's Hikes NT Server Reliability—Windows add-on ensures that pizza giant's Web efforts continue to deliver, Mitch Wagner. InternetWeek. Manhasset: Sep. 18, 2000. , Iss. 829; p. PG.29, downloaded from ProQuestDirect on the Internet on Jan. 2, 2011, 3 pages.*

(Continued)

*Primary Examiner* — James Zurita (74) *Attorney, Agent, or Firm* — Schiff Hardin LLP (57) ABSTRACT

A system and appertaining methods are provided that makes it possible to order pizza and other products using an instant messaging or other signaling mechanisms such as cellphones and two-way pagers, using a tokenized representation of the order elements. Signaling mechanisms provide context sensitive help to facilitate the use of the tokens, and a system then processes the order to the end point system for immediate preparation and/or delivery of the products. Communications may be implemented by a system in which a non-secure channel is used to poll a central server to determine if there is any data available, and the actual data transmission, if available, is provided over a secure channel.

32 Claims, 3 Drawing Sheets

OTHER PUBLICATIONS

Domino Effect—Ordering fast food via the Web catches on, Raymond M. Lane. VARbusiness. Manhasset: Oct. 30, 2000. vol. 16, Iss. 22; p. PG.57, , downloaded from ProQuestDirect on the Internet on Jan. 2, 2011, 3 pages.*

Domino's Takes Web Orders—Pizza maker finds efficiency in service that works with its order system, Mike Koller. InternetWeek. Manhasset: May 7, 2001. , Iss. 860; p. PG.17, , downloaded from ProQuestDirect on the Internet on Jan. 2, 2011, 3 pages.*

* cited by examiner

ORDERING SYSTEM AND METHOD FOR PIZZA AND OTHER GOODS AND SERVICES USING A STATELESS COMMUNICATION PROTOCOL

CROSS REFERENCE TO RELATED APPLICATIONS

The present application claims the benefit of the following U.S. Provisional Application Nos., which are all incorporated herein by reference: 60/734,742, filed Nov. 8, 2005; 60/816,265, filed Jun. 22, 2006; 60/841,995, filed Aug. 31, 2006; and 60/845,156, filed Sep. 15, 2006.

BACKGROUND

The present invention deals with the automation involved in accepting orders sent via instant messenger and from cell phone text messaging, and contemplates an automated system for receiving pizza orders that originate on Simple Message System (SMS) or web browser equipped cell phones, a web based system to pre-configure customer information, a database method to assemble messages in real-time, and a method for transmitting these orders to intended stores using pull mechanism via hyper text transport protocol with dynamic security for low cost, and ease of installation, management and maintenance. The invention generally relates to electronic ordering of products and services, including time sensitive food products, using computers and cell phones.

In the food industry, point of sales systems have been available for the past ten or so years that are able to keep track of customer names, addresses, and order history. An example of this is National Systems TMS® which was introduced in 1986 and has processed more than approximately sixty billion dollars worth of pizza orders since that time. A point-of-sale (POS) system presents an order form to store employees, and they enter codes into the system in pre-defined screen locations to place orders.

In 1996, a QuikOrder® system made it possible for customers to place pizza orders on the Internet by filling in elements on a web form using their home computer and a browser. These orders were automatically entered into the TMS system.

The ability to place orders for pizza using a cell phone, using technology from a company named KARGO called the 9-grid, which presented a form and assisted in the order entry process was demonstrated by QuikOrder® in 2000 at the CTIA show during Mardi Gras in New Orleans.

A pizza store owner, in 2005, at Northwestern University in Evanston, Ill. accepted text messages from customers to order pizza, which he would then enter into his TMS system for processing. An embodiment of the invention provides a system and method to eliminate the manual steps involved in accepting orders sent via instant messenger and from cell phone text messaging.

There are a wide variety of signaling mechanisms in the cell phone and computer industry. In most cases however they consist of setting up an account with personal information, account code, and password for access, and then logging in to a server where the user can engage in error-checked challenge and response systems that establish communication, send a message, receive an acknowledgement that the message was received intact, and, often, a turnaround request for a reply. Communication channels can be simplex, where only one side can talk at one time, or duplex, where both sides can send and receive simultaneously.

In the simplex instance, care must be taken so that one side does not send transmissions while the other side is talking. In the duplex instance, care must be taken so that one party does not to get out of sequence with the other party, since any latency in transmission could cause messages to arrive in what appear to be an inconsistent sequence. These systems today are referred to as "instant messaging" or "text messaging".

In the previous systems, POS and Internet ordering, forms are used to provide context and sequencing for the order process. For example, an order for a pizza with sausage and mushroom, breadsticks, a two-liter soda, and an order of wings, would be entered into a form that provided a context and discrete checking for content by attribute. For example, a form might have the following attributes:

| Quantity | Size | Item | Toppings |
|---|---|---|---|
| 1 | large | thin | sausage, mushrooms, onion |
| 1 | medium | pan | pepperoni |

| Quantity | Side | Options |
|---|---|---|
| 2 | breadstx | cheese |

| Quantity | Item | Type | Sauce |
|---|---|---|---|
| 1 | wings | bone-in | bar-b-q |

In a touchscreen POS system, these codes would be represented by buttons displayed on the screen that, when touched, would present further options. In a web based system, these options might actually be pictures of the items themselves, and when these images are selected, e.g., by being clicked on with a mouse, the order elements are updated based on the selection.

The form provides the context for the computer system to understand what is being ordered. Without context, the codes do not have any meaning. For example, to express "bone-in" and "bar-b-q sauce" an abbreviated code for both elements might be "b"—in this context, it is the position in the form where the "b" is entered that determines how the computer understands what is intended.

Presenting a form on a small form factor device such as a cell phone display which is limited in width, or an instant messaging text window which is typically limited in depth because it is designed to take up a small portion of the user's screen, makes it essential that an ordering solution take up as little room as possible.

To meet this challenge a number of conventions have been created to make it possible to communicate ideas using very few characters, or in some cases with symbols, or shorthand.

For example, common expressions that are used in instant message can be expressed by using just the first letter of each word in a phrase:
Talk To You Later=TTYL
Laughing Out Loud=LOL
Rolling On The Floor Laughing=ROTFL
Thank You=TY
OK=K These contractions are easy to learn, use and understand, and the present an example of how much time might be saved by a tokenized order system. Yet a tokenized order system requires special syntax and grammar that the user would not normally encounter in an online chat discussion, and further must be explicit and defined enough to communicate the user's request with 100% accuracy to the remote computer system.

SUMMARY

The present invention is directed to a method for ordering a product or service from a vendor, comprising: providing a server located remotely from a customer with information related to the customer; sending, by the customer to the server, via a portable communications device, a directive related to an order in an abbreviated coded or tokenized format using a stateless communications protocol; performing, by the server, a context-based interpretation of the directive and associating the directive with either a new or currently pending order; associating the coded directive with a command and performing the command, wherein if an ambiguity exists with the coded directive, the server sends a message to the customer requesting resolution of the ambiguity; and sequencing multiple communications received from the customer, and providing responses associated with the correct directive from the customer.

The present invention is further directed to a method for ordering a product or service from a vendor, comprising: providing a server located remotely from a customer with information related to the customer; sending, by the customer to the server, via a portable communications device, a natural-language directive related to an order using a stateless communications protocol; performing, by the server, a context-based interpretation of the natural-language directive utilizing a natural-language processor to process the natural-language directive, and associating the directive with either a new or currently pending order; associating the directive with a command and performing the command, wherein if an ambiguity exists with the directive, the server sends a message to the customer requesting resolution of the ambiguity; and sequencing multiple communications received from the customer, and providing responses associated with the correct directive from the customer.

Finally, the present invention is directed to a method for handling multiple communications of a transaction using a stateless protocol, comprising: creating a non-secure communications channel between a centralized server and a remote server of a vendor; sending, at a periodic time interval, by the remote server of a vendor over the non-secure communications channel, an encoded value that changes each time it is issued, to a centralized server, that asks if the centralized server has any data for the remote server; providing a response by the centralized server over the non-secure communications channel that indicates whether there is or is not data for the remote server; if there is data for the remote server, then: creating a new secure communications channel by the remote server to the centralized server; requesting the data by the remote server to the centralized server over the secure communications channel; sending the data by the centralized server to the remote server over the secure communications channel; and closing the secure communications channel.

DESCRIPTION OF THE DRAWINGS

The invention is described with reference to the embodiments illustrated in the drawings and associated description below.

DETAILED DESCRIPTION OF THE PREFERRED EMBODIMENTS

The invention addresses the shortcomings of the previously discussed prior art by way of the various features described in the embodiments discussed below.

Figure 1:
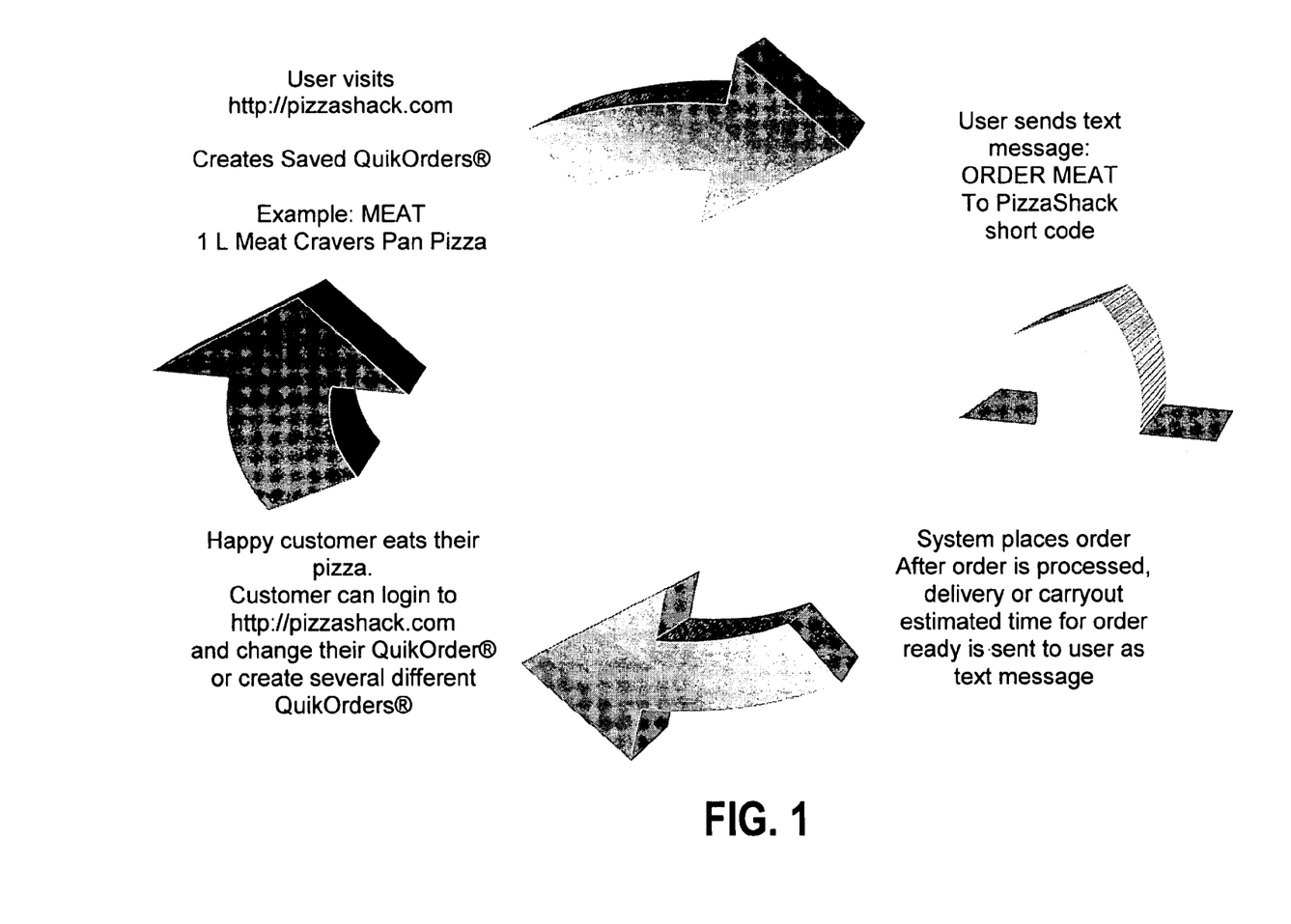
FIG. 1 is a pictorial flow diagram illustrating a general flow of the system.

FIG. 1 is a generic flow diagram illustrating one variant of the generalized process. The user visits a web site, http://pizzashack.com, and creates a saved QuikOrder® called "MEAT", and indicates that this is shorthand for one large meat-craver's pan pizza. At a later time, the user sends a text message "ORDER MEAT" to a PizzaShack short code which is deliver to its server. The server associates the "MEAT" request with the proper order instructions, places the order, and provides information related to the order to the customer. The user can make changes to the saved QuikOrder®.

Figure 2:
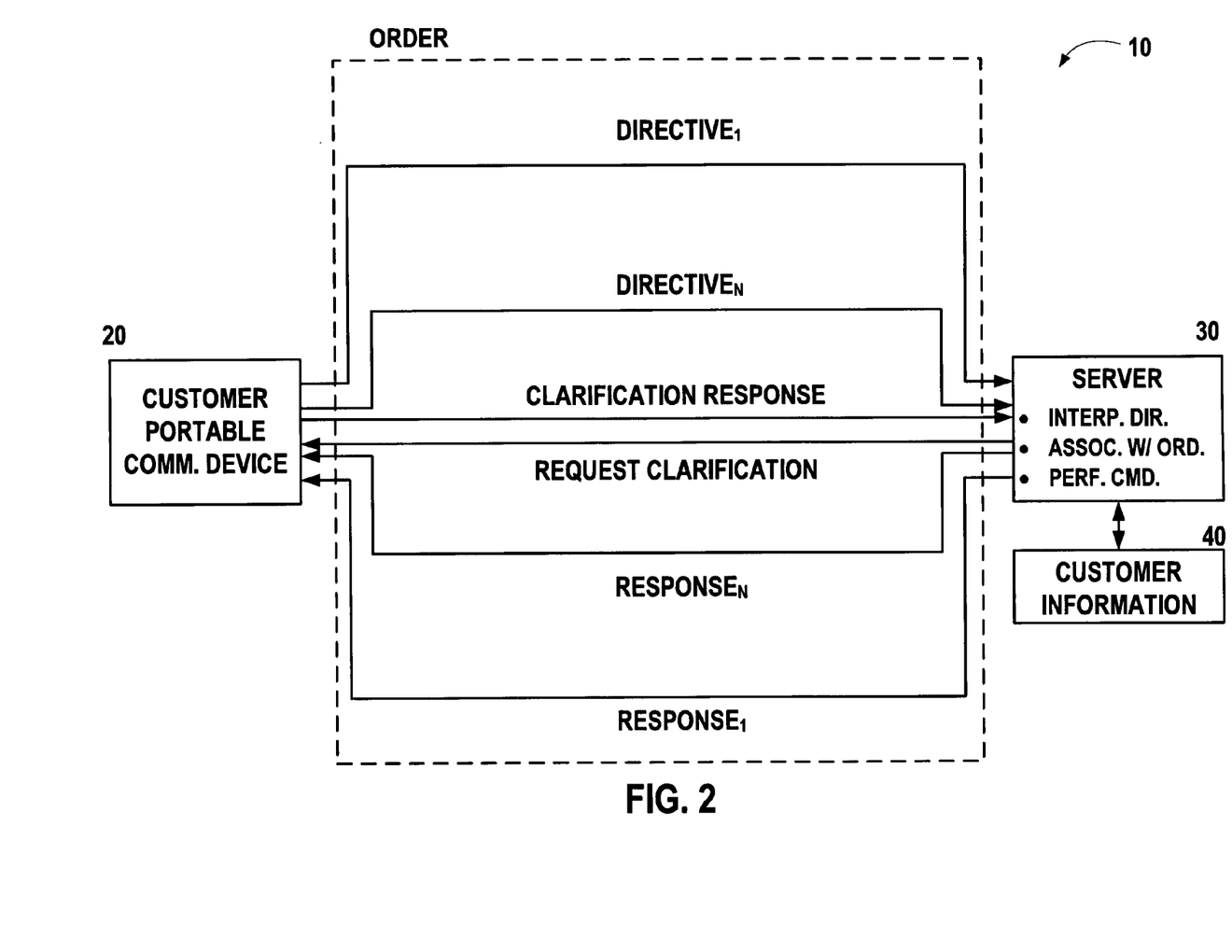
FIG. 2 is a block diagram illustrating directives and responses in the context of an order.

FIG. 2 is a somewhat more technical block diagram, and illustrates a system 10 in which communications between the customer portable communication device 20 and a vendor (or centralized) server 30 can take place with tokenized or natural language directives $DIRECTIVE_1 \ldots DIRECTIVE_N$ that may invoke a response $RESPONSE_1 \ldots RESPONSE_N$ using a stateless communication protocol, but all done within the context of an order or some other higher level context (as used herein, an "order" is construed as any form of higher level context). To the extent that a directive is ambiguous, clarification can be sought by the server 30 from the customer 20. The server 30 can maintain or have access to customer information 40.

An embodiment of the invention provides a mechanism to help teach the user how to use the system during the use of the system. A help system is available, as are shortcuts to make it possible to order specials with as few as three characters.

This may be accomplished by using designations, for example:

Alphameric whether or not an element is alphabetic or numeric;

Position an element's position in the string may determine its content;

Sequence an element may have different meaning based on the sequence of other elements in the string;

Unique an element may have a unique code that identifies it in context;

Content the value of an element in context;

Case differentiating an element based on whether or not it is upper or lower case;

Default for a given position or sequence, if not specified, use this value;

Specials predefined food orders or special values that a user may select using the "specials syntax";

Preferences user defined special orders or repeat of a previous order.

In addition to using these designations, combinations of the positional or case/character restrictions in the content that will comprise an order may be utilized as well. This makes it possible to convey both context and content in a single character.

Using the above concepts, a sample syntax for ordering a pizza might be order elements that comprise:

| | |
|---|---|
| Numeric quantity | Number |
| Product size or type | Positional unique |
| Primary Product attribute or feature | Positional, Content or Case Unique |
| Secondary product attribute or feature | Positional, Content or CaSe Unique |
| Tertiary product attribute or modifier | Positional, Content, Unique or free text |

Using the above-described syntax, for example, the string:
1LTsmo
may expand to:
One Large Thin Crust Pizza with Sausage, Mushrooms and Onions In the context of a menu selection, a particular menu might consist of:
Specials
Large pepperoni pizza, order of breadsticks, 2 liter coke for the special price of just $9.99

Two large pepperoni pizzas, 2 orders of breadsticks, and a 2 liter of coke for the special price of $16.99.

Using a special designation, such as an ampersand "&", this could be expressed as:
&1 or &2

Thus, by typing just three characters (including the "enter" or "return" key), a user could order one of these specials, or, using a pre-designated order "A", could order with just four keystrokes, e.g., "O" <SPACE> "A" {<SEND>, <ENTER>, <RETURN>, or <GO>}. In order to minimize the number of keystrokes and the possibility of having the "specials" character be an ambiguous character that requires further resolution from the customer, a process or algorithm can be utilized that prevents the single character entry on the server from being used by an additional command, i.e., the single character entries are unique.

In operation, the system can work in the following fashion. Customers who want to take advantage of the system create a profile on a web form; this form can either be created online or sent as an e-mail. The form identifies the customer, his/her e-mail information, and his/her instant messaging carrier, account code, and possibly other information, such as preferences, delivery instructions and payment information if applicable. The following example illustrates data that could be entered.

| Desc | Data |
|---|---|
| phone | 3334446666 |
| name | john smith |
| address | 123 main street |
| city | Anytown |

-continued

| Desc | Data |
|---|---|
| state | US |
| zip | 0 |
| location name | Home |
| credit card# | *************3304 |
| expiration | 807 |

In addition to including a mechanism for selecting products for purchase and a payment method, the user can create orders that are to be repeated. This is common in the pizza delivery business, where people often order the same product when ordering for delivery or carryout, such as a large pepperoni pizza and a can of soda. The user may create orders as though they were ordering, but instead of actually ordering, they are saved as "quikorders" and catalogued by a user defined name, such as "tues nite" or "party" or "kids." Each of these order types can also have instructions related to delivery instructions, as well as payment type or last 4 digits of a credit card number on file, and an optional pin that could control who could order a given order. The following exemplary table illustrates such a concept.

| Exemplary Cataloged QuikOrder ® Records | | | | | | | | | | | |
|---|---|---|---|---|---|---|---|---|---|---|---|
| Name | Qty | Size | Crust | Left | Right | Drinks | Sides | Pmt | Del Pu | Loc | Pin2 |
| party | 2 | large | thin | P | P | 2 L | | 3304 | DP | HOME | |
| kids | 1 | medium | pan | | | | | 3304 | D | HOME | |
| family | 1 | large | thin | P | PO | | | K, 3304 | P | | 123 |
| | 1 | medium | thin | | VEGIE | | | | | | |

The user may then enter the telephone number of the cell phone that would be authorized to order these pre-defined orders from a cell phone along with a pin value to assure that the phone is not used for ordering without permission. For security purposes, the system can replace sensitive data with a mask, e.g., asterisks.

| Desc | Phone # | Pin |
|---|---|---|
| Phone1 | 3334445555 | *** |
| Phone2 | 3334446666 | |
| Phone3 | 3334447777 | |
| Phone4 | 3334448888 | |

Once these phone numbers have been entered into the system, they are moved into the "active" database index and are available for instantaneous retrieval. Once this process of setting up the online order system for cell phone ordering is complete, a user can then begin to use the cell phone order service.

The computer system logs in to one or more messaging services and wait for messages. As messages come in, they are identified at the server by their service and account code. A cross referenced list is maintained that consolidates orders for a customer who might have multiple accounts, e.g., a Microsoft Network (MSN), America On-Line (AOL), and cell phone account code—these are kept together as "Aliases" using multiple indexes.

If a customer is unfamiliar with the required syntax, he could contact the service and send a character or token requesting help, such as a question mark "?". The service responds to this with the menu, syntax instructions, and examples of how to create an order. The response can be global or context sensitive.

If a customer is already familiar with the required syntax, then he could simply log in and type:

1LHsmo

Which the service could respond with:

Thank you Mark for your order for one large hand tossed pizza with sausage mushroom and onions.

Please confirm your order by replying with "A32" or copy and retransmit this sentence to us.

The user would then confirm, and the order would then be processed into the order system.

SMS Implementation

It is also possible to implement an embodiment of the invention that utilizes a Short Message Service (SMS) or similar text messaging protocol. Hereafter, the term "SMS protocol" and "SMS message" includes all protocols, messages, and communications technologies that provide generally similar functionality, i.e., sending short messages between mobile phones, handheld devices, landline telephones, etc. The SMS protocol includes a unique number with each message transmitted, in most cases corresponding to the ten-digit telephone number of the handset or device that serves to uniquely identify a source.

The Simple Message System is a text messaging tool that allows nearly instant, though not necessarily error free, message transmission across multiple carrier cell phone networks. Message length is limited to 160 characters. A carrier convention called "U.S. Shortcodes" allows merchants to establish a 5 or 6 digit number to which the carriers can aggregate and flow messages through a gateway server. The messages contain within them the telephone number of the originating cell phone. While not all cell phones and PDA's are capable of SMS messaging, it is becoming more and more popular worldwide.

For carryout service, the unique telephone number identification may be enough to validate that this is a legitimate order. In order to derive a delivery address from the transaction, a global positioning feature of the handset might disclose a current location of the phone. Alternatively, the customer would have set up profiles that include one or more delivery addresses that may be associated with a given ten-digit telephone number. For example, if a customer worked in two locations, he/she might have duplicate living arrangements in each locale.

Ideally, the system could even be utilized without a user pre-registering. In this scenario, e.g., the user's identifying information transmitted with the SMS message is cross referenced with another database, such as a reverse phone directory or other registry that can correlate user identifying indicia with an address for delivery. In a further embodiment of this variant, it is possible that the user does not have to ever register, but the system can keep track of the user via his/her identifying indicia and develop a set of preferences for a particular user.

However, it is also possible that a user could pre-register at, e.g., a web site or even through the use of SMS messaging, such that an even simpler mechanism can be achieved. For example, suppose a user might normally enter "1LP" to order one large pepperoni. This could be entered into a list of user preferences so that the user may only have to type a "1", and the system would correlate user preference 1 with "1LP". Any number of preference numbers or letters could be used in this manner. A web-based set up would be preferable, as it affords the most flexibility and clear instruction. The user could enter any amount of default information into the preferences, such as a default credit card number to use, etc. Furthermore, on the server side, additional attributes can be associated with a particular user, like frequency of order, etc., and, e.g., bonuses and discounts could further apply. In this way, a user can very easily and quickly place a pizza order without significant effort on either the buyer or seller's part.

Note that although text messaging and SMS messaging are described above, the invention contemplates and is easily extensible to a web enabled phone browser, Wireless Application Protocol (WAP), or even a normal web browser—these protocols can implement and benefit from the abbreviated syntax described herein.

Additional Directives

It is further possible to provide other directives via this mechanism. In an embodiment, a user enters a destination number and a directive and attributes to their SMS enabled cell phone. The message goes to a gateway provider that interprets the destination number and routes the directive and attributes to the application provider or host system. The directive can be any function that the cell phone service or end service is designed to provide.

In an order application, one feature of the application might be to permit a user to query, "what is the status of the order that I just placed?" which is illustrated below by way of an exemplary embodiment.

This directive may then be set up as "STATUS" and the user can now enter on their cell phone keypad the text "STATUS" to shortcode 10111:

10111 STATUS

This request is then sent to the gateway as:

3334446666 10111 STATUS

The gateway server performs a lookup on the shortcode 10111 in a table and finds a URL reference SMServer.quikorder.com which, upon lookup, translates to an IP value of 192.168.3.43, and the gateway server performs an HTTP post command with the data 3334446666 STATUS to 192.168.3.43.

The web server at the host company parses the request into 3334446666 and STATUS. It performs a lookup on 3334446666 and determines that there is an order in current status for this user account 3334446666 and it displays the status.

The "STATUS" command then looks up the order and sends it back to the customer via the SMS Gateway interface: STATUS nnnn, where nnnn is a transaction ID provided back to the user after they submit the order. For example:

| User entry | Response Message |
| --- | --- |
| ORDER xyz | Reply 'KXZ123' to confirm |
| KXZ123 | Your order has been placed. Confirmation #129112. To check order status, reply 'STATUS 129112'. |
| STATUS 129112 | Order 129112 was dispatched at 1:23PM |

If the customer uses the directive "Order", then the process involves the entry of a stored order item, the entry of a special offer coupon number that may be a unique serial number that identifies the offer source, date, and time of the offer, or it could be a special offer number that is at a special price for a limited time, and then the delivery or carryout instructions.

For example, the user could type "order party" and the system might respond with, "Enter "D" for delivery or "P" for pickup and enter "K" for cash and "T" for credit card", or these details might be stored with the pre-encapsulated order stored on the website.

Server Side Handling

From a technical standpoint, the Simple Message System (SMS) is what is called a "Stateless Protocol"—that is, each message stands on its own and is independent of all other messages either before or after. Therefore, when messages are sent to/from a cell phone or gateway, each message comes in with its identifying phone number and data, but no message number or other identifier that might indicate it is part of a message, all of a message or possibly the context.

For this reason, the preferred embodiment of the order system includes a high performance database that could implement, e.g., sparse array storage. A sparse array storage mechanism stores data very efficiently, only taking up space for values that exist. In other databases, it is necessary to keep space available for the maximum size of each table. For social security numbers, for example, a fixed record database would have to have 999,999,999 positions available even if it just had two values,111111113 and 111111117, in the database.

The example below illustrates two cells having data in a fixed field database out of ten, although one can imagine how inefficient having nearly a billion other cells with no data in them would be in this arrangement. Sparse array storage database include MSM and Cache from InterSystems Corp.

| | |
|---|---|
| 111111111 | |
| 111111112 | |
| 111111113 | DATA |
| 111111114 | |
| 111111115 | |
| 111111116 | |
| 111111117 | DATA |
| 111111118 | |
| 111111119 | |
| 111111120 | |

In a sparse array database, only two positions are used to store the two digits:

| | |
|---|---|
| 111111113 | DATA |
| 111111117 | DATA |

The sparse array mechanism not only saves an extraordinary amount of space, it also reduces processing time in manipulating data. For this reason, it is an ideal candidate for a system to manage subsets of large tables. Extraordinary speeds can be achieved compared to other approaches.

Thus, the sparse array mechanism is well suited to the dynamic creation of filter syntax for parsing natural language and free text. Since each merchant on a website could have a special vocabulary specific to the products and services they offer, the database is capable of indexing this information dynamically and offering very quick access to the data.

The use of the high performance database is applied to the problem of converting the stateless simple messages into a coherent context. As messages are sent and received, they are appended with a UTC date and time in seconds, plus a tie breaker indicator in the event that messages happen to queue up at the gateway server and multiple messages are delivered in one second. The tie breaker assures that any SMS messages that reach the system will not be missed, once they are received by the system—of course, since not all SMS messages are delivered, the system in this scenario has no way of determining that it missed an SMS message.

To illustrate, the following might be the queue received by the database system:

| date | Time | tie breaker | phone | context | data |
|---|---|---|---|---|---|
| Aug. 30, 2001 | 18:50:34 | 0 | 3334446666 | FIND | |
| Aug. 30, 2001 | 18:50:39 | 0 | 2221114444 | ORDER | 213434 |
| Aug. 30, 2001 | 18:50:34 | 0 | 2334343343 | NO | |
| Aug. 30, 2001 | 18:51:12 | 0 | 3334446666 | ORDER | PARTY |
| Aug. 30, 2001 | 18:53:20 | 0 | 7084433344 | ORDER | FAMILY |
| Aug. 30, 2001 | 18:53:20 | 1 | 7084443344 | D K | |

The system sorts the transactions by phone number, date, time, and tie-breaker in order to arrive at the context of a specific transaction and it shows that one transaction has a missing context (38 seconds apart).

| Aug. 30, 2001 | 18:50:34 | 0 | 3334446666 | FIND | |
|---|---|---|---|---|---|
| Aug. 30, 2001 | 18:51:12 | 0 | 3334446666 | ORDER | PARTY |

The tie-breaker is derived as records are received from the gateway server. As each record arrives, a lookup is performed on a key consisting of the phone, date, time, and tie-breaker which should report a "not found" since it is unlikely that a user could send two SMS messages in the same second.

For example, the following is an inbound-message that arrives from the Gateway at the time indicated:

| Phone | Date | Time | Tie | Context | Data |
|---|---|---|---|---|---|
| 7084433344 | Aug. 30, 2001 | 18:53:20 | 0 | ORDER | FAMILY |

And at the same time, in the same or another facility, another record is received from the same phone number:

| Phone | Date | Time | Tie | Context | Data |
|---|---|---|---|---|---|
| 7084443344 | Aug. 30, 2001 | 18:53:20 | 0 | D K | |

When the second record is read, the system notes that there already is a record with the same phone number, date, time, and tie breaker value (0), and it increments the tie breaker to 1, checks again to see if there is one already, and if not, inserts the record with the incremented tie breaker.

| Phone | Date | Time | Tie | Context | Data |
|---|---|---|---|---|---|
| 7084433344 | Aug. 30, 2001 | 18:53:20 | 0 | ORDER | FAMILY |
| 7084443344 | Aug. 30, 2001 | 18:53:20 | 1 | D K | |

The "Tie-Breaker" is an important element in this process. Operational guidelines for SMS Gateway servers may have certain limitations regarding outbound messages per second per Shortcode, although the systems are generally scalable to a wide range of message volumes. While any one cell phone might not be capable of generating more than one message per second towards the Gateway, should messages queue up along the way, or arrive out of sequence, it is possible that two messages for the same phone number could arrive in the same second, and possibly more.

In addition, since Internet infrastructure is typically redundant, with multiple web servers and multiple hosts, often geographically distributed, there is the possibility that multiple messages could arrive essentially simultaneously at two different host systems, but while the timestamp would be the same, the messages could be different, and perhaps even out of sequence.

However, for SMS messaging it is important to be able to understand the context and relevance of a message that the records be kept in sequence by time, since time provides the context for the meaning of the messages from any given cell phone.

For this reason, the key value consists of the Phone, date, time and a tie breaker. If multiple systems are used, then the tie breaker starting values should have an offset that accounts for the relative speed of the processors. In this instance, since 50 is the published limit, for safety's sake, one could use 100 as the tie breaker offset, or, for an even larger margin of safety, 1000. This would allow 10 host systems to each have 100 (or 1000) tie breaker counters per second. The first system would use 0-99 (or 0-999), the second from 100-199, the third from 200 to 299, etc. In this way even if a cell phone could transmit more than one message per second, or if a process along the way should delay a large number of messages, even if these messages were to be load balanced to two or more different servers, they would still be able to be reconstructed in time sequence to the second in real time.

Creating the tie breaker value is a process of testing the database for the existence of a record with the tie breaker value. If the test shows that the tie breaker value has already been used, then an identical message was already received and stored, and the tie breaker count for the records for that second is incremented by one, and an attempt is again made to insert the record into the database; this step continues until the record is accepted. The system keeps track of tie breakers by incrementing a counter on an index value that consists of masterfile (phone, date, time, tiebreaker)=count_of_ties.

Now that a coherent and time sequenced view of these customer interactions exists, the system has to be able to determine an appropriate response in context.

The system has to dynamically recognize a user defined argument, in this case "party", that is now being returned in the context of a command. In order to respond intelligently to this, the system has to work down the priority hierarchy for parsing the syntax. First it must be determined if "party" is a defined or reserved keyword, indicating a special offer, and, if so, what parameters are required to order it. For example, below is an exemplary list of the specials:
SPECIALS
FEAST
LCH
SUPER Since "party" is not in the SPECIALS list, the system now evaluates if "party" is one of the coupon values associated with an offer in a print or TV campaign that is in progress at the time. Below is an exemplary list of coupon values:
A32433
BGB3434
F823434

Since "party" is not in this list, the system then looks to see if "party" is one of the names for the user's stored special. In this case, "party" is found under an account related to the phone number 3334446666. Note that if "party" had been found in any two of the contexts, the system could have sent a message to ask the user to resolve the ambiguity and identify which one they wanted. The system could also be designed to reverse the priority of these interactions, or implement a predetermined priority.

The preceding paragraph describes a process referred to as "dynamic disambiguation" of user input and is based on a previous interaction with the user. For example, given a saved QuikOrders® of: MEAT, SALAD, and MOMS:
ORDER S orders the SALAD
ORDER M yields: "Did you mean MEAT or MOMS?"

Thus, when placing an order, the user's order history is maintained, which permits a "stateful" or "state-based interaction" with historical data in a stateless environment.

Now that the system knows what "party" is, it also knows that this context requires additional information: specifically, delivery or carryout and payment type.

The system looks in the customer's profile and sees that the customer has authorized "party" to be available for either delivery or carryout. Note that if "delivery" is specified, the location for delivery is "HOME" which corresponds to the address in the primary profile for the customer.

The system then looks at the Pmt or payment type field, and notes that there is an entry of the last four digits of a credit card number and no other value such as "K" (which represents "cash") which indicates that the customer has specified that this order should default to the credit card number on file with the last four digits as shown. Therefore, instead of prompting for both delivery instructions and payment instructions (since it has all needed information for payment), it only prompts for delivery instructions:
Enter "D" for delivery or "P" for pickup.

If the preset field has contained "K, 3304" instead of just "3304", the system would have prompted the user with:
Enter "K" for cash or "T" for credit card.

But since only the last four digits of the credit card were in the profile for the phone number in use, the system only prompted for delivery or carryout directions. Therefore, the user only had to type the shortcode "1#8#1 ORDER PARTY D" in order to complete the order transaction.

To receive the confirmation:
Confirm Pizza Hut ORD 2 LG Pep+2L—DLVR HOME—Credit ****3304
Enter "Y24" to confirm Note that the response to confirm is a generated number instead of just "YES", the generated number being unique for a particular transaction element that anticipates a response. Having the user always respond to a dynamically built response string helps the system to determine if there are any missing messages. The system can then know, for example, which page the customer had completed, and can determine if there were other questions pending.

If the system had previously confirmed another request for this customer, it might have asked the user to reply "Y19" for that response. The system keeps track of the responses and indexes them so that the message context could be derived from the response string itself.

As described above, the Text Message Command Syntax consists of a handful of pre-defined commands, and user-supplied parameters. Each command may have a canonical "Long Version", several "Short Versions" and a "T9 Alternate". Any alternate form can be used in an SMS MO message interchangeably at any time. MT messages will consistently use the "Long Version" as it is the most clear. The "Short Versions" are simply all substrings of the "Long Versions" anchored at the beginning of the command.

The following is a chart of possible commands and their synonyms:

| Long Version | Short Versions | T9/ABC Alternates |
|---|---|---|
| ORDER | O, OR, ORD, ORDE | M |
| STATUS | S, ST, STA, STAT, STATU P | Q |
| LIST | L, LI, LIS | J |
| HELP | H, HE, HEL | G, I |
| FIND | F, FI, FIN | D, E |

Importantly here, the machine-recognizable short text messages imply simplicity. It is possible to achieve the desired result with relatively few commands. User-supplied parameters, such as their short code for an order, can similarly be shortened to any unambiguous substring 1 to N. By way of further example, the following is a set of Saved QuikOrders® for a sample user:

MEAT—Meat Craver's Pizza
SOCCER—Pizza and sodas for fourteen hungry kids
POKER—Pizza for five hungry guys
MOMS—WingRoad Apple Pie When the above example user makes an ORDER:

ME, MEA, MEAT would all mean MEAT
S, SO, SOC, SOCC, SOCCE, SOCCER would all mean SOCCER
P, PO, POK, POKE, POKER would all mean POKER
MO, MOM, MOMS would all mean MOMS Thus, the following are all synonymous examples of ordering the Meat Craver's Pizza:

ORDER MEAT
ORDER ME
ORD ME
OR ME
O ME
O MEAT
M ME

Note that 'M' alone for this set of saved QuikOrders®, as described above, could return a message that their entry was ambiguous and require the user to try again. For example:

Hello RICH
M is ambiguous.
Did you mean:
MEAT
MOMS

Thus, in order to get MOMS Apple Pie, the user would need to try again with, e.g.: ORDER MO According to an embodiment, users are able to login to a respective product/service provider, e.g., http://pizzashack.com, at any time to change their codes. A savvy user might rename "MOMS" above to "APPLE" so that "ORDER M" would be unambiguous. The following speed-enhancing features may be incorporated:

a. utilizing disambiguation which forces the user to set a different starting or first letter of each special to be different from the first letter of all other specials. This makes it possible to assure that any special may be ordered by just entering the first character; and
b. in the same way, the first letter of each command may be used, since the commands can all begin with different letters—O for order, L for List, S for Status, H for help, etc.

The following example illustrates one possible current output for HELP for each command:

HELP FIND
Find stores near any US zip.
Gives address/phone of stores.
Stores may not deliver everywhere in that zip; call store to insure delivery.
HELP ORDER
ORDER code with an optional PIN will place an order.
ORDER alone will list all your Saved QuikOrder® choices as a reminder.
HELP LIST
LIST can be used to display the QuikOrder® selections you have set up. 'LIST xyz' will provide details about your 'xyz' QuikOrder®.
HELP STATUS
STATUS lists recent orders placed via text messages, with current status in the QuikOrder system. Tracking through to delivery coming soon.
HELP HELP
'UPPERCASE TEXT': something you send as-is.
'lowercase text': place-holder for information you type.
[square brackets]: optional text.

The above described pre-fabricated order process and system is very fast and efficient for cell phone orders, but it does require proper preparation and setup. The setup program for the user defined orders has to be intelligent enough to make sure that all of the syntax, items, descriptions, and topping codes are correct to assure a trouble free experience.

Natural Language Analysis

However, not all interactions for a given concept can be prefabricated. For this reason, an embodiment of the invention also includes a free text parser and natural language analyzer that is fast enough to keep pace with SMS messaging expectations for multiple customers and multiple contexts.

There are many different approaches to vocabulary recognition, parsing, text interpretation and natural language processing for both written text as well as voice recognition software. One thing that they have in common is the need to limit any given context as much as possible in order to have as few decision points as possible, since the complexity of a voice or natural language recognition challenge goes up exponentially as the phrase length increases. Statistical methods that focus on words or phonemes that statistically precede or follow one sound or another are one method that is used, but limiting a given challenge to a small number of elements is one of the first challenges.

For pizza and other food ordering applications, the problem is compounded by the fact that there are nearly 525,000 restaurants, each with different recipes and product descriptions for very similar products.

For this reason, systems that attempt to do natural language processing for voice require custom programming and a training period during which the custom sounds are associated with the correct actions or contexts.

For the written word, with unique letters and numbers, the recognition problem is reduced, but the creation of and adaptation of the rule base requires that the data itself become part of the solution. Once again, the dynamic assembly of a fast access indexed database of rules and terms is important, and for the purposes of cell phone ordering, it must be assembled in real-time on the fly as messages are received.

The examples thus far have assumed a given syntax and recognition context. As messages come in, they are assembled in chronological sequence, grouped by target shortcode or vendor code, and then matched against the codes that define the vendor's products and services.

To make the natural language processor work, the database is again employed, but this time instead of creating a timeframe context for a sequence of messages, a syntax table is created dynamically from the vendor's codes, and the system appends attributes to direct the parser what to expect or request in context. As is done with voice processing, ideally the choices are limited at each juncture.

This starts with syntax assumptions and pre-processing and standardizations. First, there are certain things that must be agreed upon that a customer must do. According to an embodiment, the customer must specify the quantity of a particular item as the first element, and must use a numeric to do so.

Second, the system presumes that there are no duplicates in a given attribute level. For size, e.g., X means eXtra large, L means Large, M means Medium and S means Small. For crust, e.g., T means Thin, P means Pan, H means Hand Tossed, I means Italian, and S means stuffed.

The system starts by generating all of the possible combinations for a subset of orders. The host system performs a lookup using the directive and the attributes and responds according to either a pre-defined sequence of instructions, or a dynamically constructed sequence of instructions which is built as a result of real-time inquiry against the status of one or more databases, according to a rule set.

Once the response is sent, the customer is then in a "context" or mode of operation where she is able to make further requests to the host. Natural language processing is enabled by a parser and syntax generator that can be dynamically fed from a database table. Each target location or "vendor" can have its own vocabulary and syntax rules. This makes possible both multi-product and also multi-lingual modes of operation. Once the vendor and/or product and/or language preferences are determined, the system builds the grammar and syntax rule set from the context.

For example, a message could be sent to shortcode 10801 with the directive "ORDER" where 10801 is a restaurant identifier and "ORDER" is a directive to start an order process. The system would respond with a series of responses and answers according to the rule-set and requirements established for "ORDER."

For a simple transaction the customer might enter the "order" context and then enter "?" which could, by convention, cause the host system to respond with the menu for the target restaurant. Then, using the method described above, the customer could enter an order for a pre-configured order ("FAMILY FEAST"), an item seen in an advertisement in print or other media that contains an order code such as "AB123", or it could be a natural language expression of the customer's desire such as 1LTP/PM4C (one large thin crust pepperoni pizza with mushrooms on ½ of the pizza for carryout.)

For the natural language example, an index table in a database using binary tree techniques is used for very rapid lookup of key values. The user entered order phrase is deconstructed according to basic syntax rules, and then the remaining string of characters is normalized according to a set of character value sequence rules. For interchangeable letter codes, for toppings for example, MP is the same as PM, the only difference being the order in which the values appear.

Using the collation sequence of the letter values, a standard sequence for the values for each topping list is created for each store, in this example alphabetical sequence would be used. In this way, a customer could order Pepperoni, Mushrooms and Onions with the codes PMO and the system would re-sort it to MOP. A customer could order Onions, Pepperoni and Mushroom, or OPM and the system would again resequence as MOP. The normalization process results in sequencing the values so that equivalent values present consistently. This reduces the index size. Once the strings are normalized, the index is created.

Customer orders PMO, POM, MOP, MPO, OMP, OPM
System normalizes as MOP

With the index created, the comprehensive list of potential order combinations is known and quantified as an index value. As SMS messages arrive, they are decomposed in the same manner that the index values were, and they are reassembled in the normalized format and sequence, and then a lookup is performed. If there is a match in the index, then the order elements are validated and the order can be confirmed.

The system does all of this computational effort one time, and then codifies the result in an index table in a binary tree sparse array database. While the conventional system has to load both the validation database and the programs necessary to perform the validation, the system according to an embodiment of the invention normalizes the sequence of characters and performs an index lookup in the b-tree database. If there is a match, then the order is valid and can be processed. If there is no match, then the user has entered something invalid or the sequence is incorrect, and it must be corrected. All possible known values are normalized and contained in the index.

The system is able to synthesize diverse key-press input algorithms into a cohesive general solution. For example, an iTap, T9, and standard multi-Tap entries of G, H, and I can all return HELP. Furthermore, an automated message dispatch can be tailored to specific carrier parameters to maximize resource utilization without sacrificing message delivery reliability. For example, Boost Mobile customers enjoy a 496 character message length, whereas most Canadian mobile users are limited to 140 characters. The system can be configured to recognize and work within specific limitations that are inherent with the communications service provider. For example, some Verizon/Motorola handsets provide a Subject line, which could be utilized. As a general rule, it is advantageous if user-friendly customized interaction is employed, e.g., users are greeted by name when using account-specific commands.

Furthermore, the system can employ domain-specific natural language substitution to dynamically compress messages on an as-needed basis, maintaining a minimum level of comprehensibility. For example, if a message is too long, successive substitutions can be made. The following are exemplary substitutions that may be made:

Extra Large->XL
Extra Cheese->XtraChz
Extra->Xtra
Italian Sausage->Sasg

In the preferred embodiment the system employs a sparse array database system with binary tree or "B-tree" logic that makes it possible to extract and compress specific vendor data to very small tables in a very short period of time, making it possible to reply to complex queries in real time.

One of the problems with data based logic is that illogical conditions can exist when multiple data structures express a set of logical values. It is possible that two values could be set that conflict, and something like a "fatal embrace" occurs, causing a process to rapidly run out of control in a logic loop. According to an embodiment, an error handling routine handles all clarifications and feedback to/from the user during the session. A second process is run in parallel, and it monitors queue sizes and CPU loading to assure that the dynamically generated responses cannot cause an infinite loop in the event that an illogical condition is encountered for any reason.

Pull vs. Push Mechanism

Once the order is submitted to the system, it is sent to a pending transmission queue. Conventionally, at this point in a "push" process, the order would be transmitted into the store.

However, in a push process, the only time one knows that there might be a problem with transmissions to a remote location is when orders start failing. Since one pushes data only when orders are present, it is not possible to keep track of what is happening on a remote system until after the communications have been established. Moreover, if there is a problem in the remote location and it is not responding, that is all the central site can know.

Figure 3:
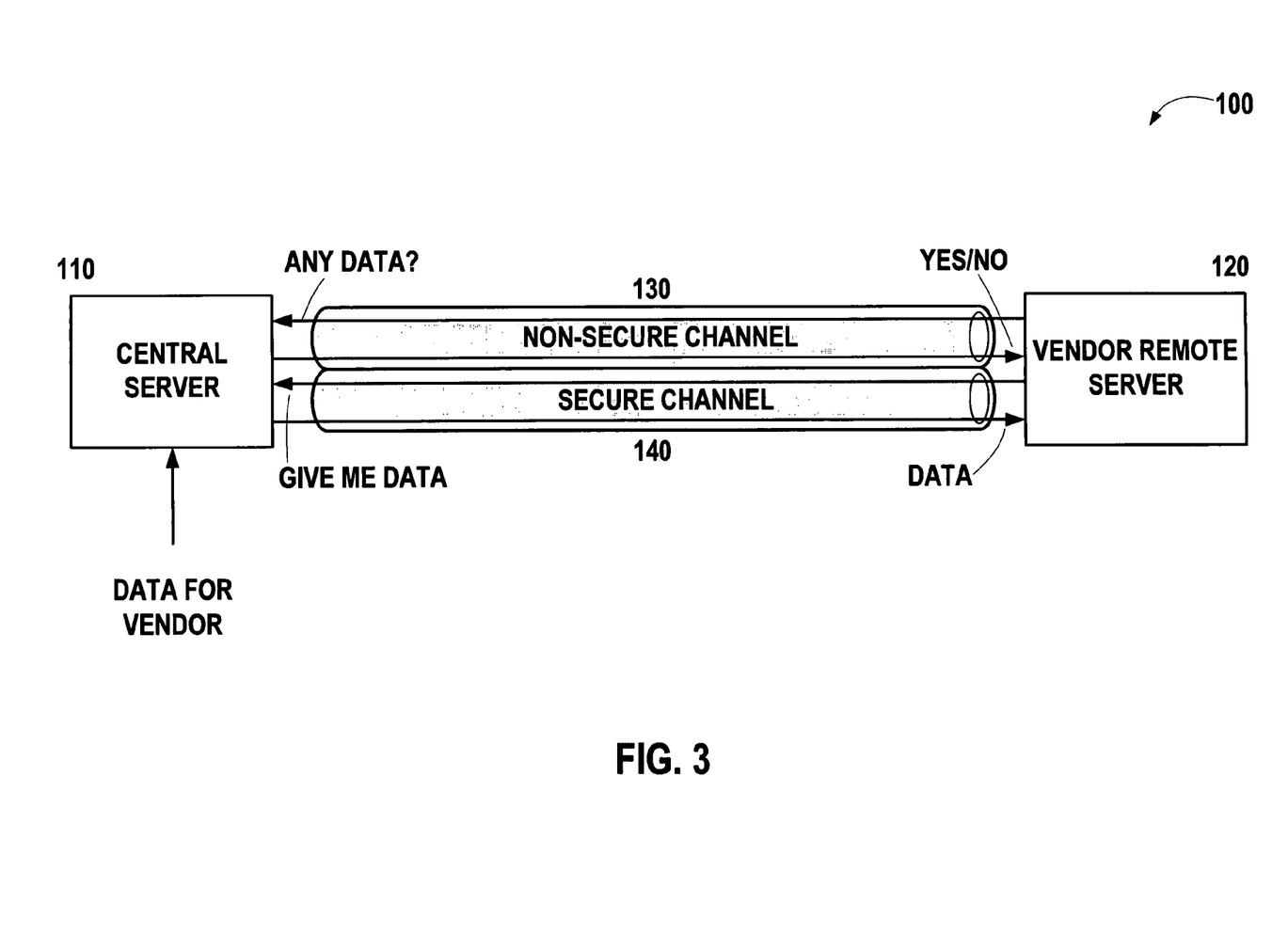
FIG. 3 is a block diagram illustrating the use of non-secure and secure communications channels.

The preferred embodiment utilizes a "Pull" mechanism described herein as "QS", and is illustrated in FIG. 3. In the system 100 shown, the remote site 120 sends an encoded inquiry to the central site 110, a configurable number of requests per unit time based on time of day and other factors, that can dynamically increase or decrease based on business volume or other factors. The remote site 120 continues to request information from the host system 110, essentially asking "do you have anything for me" (ANY DATA?) in an encoded value that changes each time it issues based on an encoding algorithm that combines some variable information, such as date and time, with the request. The clear text might be "site 1234—any data for me now as of Aug. 30, 2001 14:54 PM?" encoded as "%$#@Sasrf234ARS#" using a hash that could change each time the query is made.

The query could be made in a non-secure channel 130, such as an HTTP (non-SSL) web request, since no sensitive data is contained in the encoded request except for the (variable) site ID number. If the host site 110 says "Yes, I've got something for you" (YES/NO), the remote site 120 then changes mode and makes a new secure connection 140 using Secure Sockets Layer (SSL) protocol, requests the data (GIVE ME DATA), receives the transmission (DATA), and then closes the session and goes back to polling for a "data available" response from the host site, or a "data ready for transport" signal from a local process or another system located at the remote site. The creation and closing the non-secure channel 130 and/or the secure channel 140 can be initiated/controlled by either the central server 110 or the vendor remote server 120.

For example, the QS system could request data from the host, receive an order ready message, change the SSL mode to retrieve the order data, and then store the data in a database, file, memory, or other location that is accessible with adequate security and then raise a flag to notify a local processor or POS system that data is available.

The advantage of making HTTP requests from multiple sites to the central site without entering SSL mode is that it reduces the amount of bandwidth consumed, amount of processing power consumed, and the number of SSL sessions that need to be managed at any given time. Entering SSL mode only when secure data needs to be exchanged is an efficient mechanism.

Or, if there is remote data ready to be returned to the host system, the remote data system can send it back to the host. The data sent to the remote host can also be put into a local database, stored in memory or another device or on disk or other mechanism, or be transmitted into a TCP socket connection to another system or application such as a POS system at the remote site.

The advantage of the "Pull" mechanism is that the central site can, if it wants to, keep track of every request made by each remote site and their current activity status. The other advantage of the "Pull" mechanism, is that an HTTP request, similar to the one made by the QS system can also be accomplished by using a web browser, providing a very simple method of debugging a potential communications problem. If the browser request is successful, it would indicate a problem with the QS response. If the browser request is unsuccessful, it would indicate a problem with the remote site connection. The simplicity of this debugging process is orders of magnitude less than what might be required in the event of an inability of the central site to reach the remote site on a "Push" basis.

Moreover, the "Pull" mechanism eliminates the problems of "pushing" to a site that has a firewall or restricted router configuration. Firewalls block unwelcome traffic, but allow traffic if it is being sent in response to an outbound request. Solving transmission problems going through firewalls is a very challenging task often requiring great expertise and many hours. The "Pull" mechanism eliminates the need for this work since all traffic is sent in response to an outbound request, complying with firewall rules.

Once the remote site establishes a secure connection, the data exchange can be controlled from the host location and updates can be performed on the data and if necessary the software. It should be noted that handling messages from multiple systems where the messages come in asynchronously require a more active synchronization or timestamp checking between distributed systems.

The push/pull order transmission mechanism can be utilized with any form of remote order transmission, including Internet ordering, and is not restricted to SMS messaging. Furthermore, for messages arriving from the same phone number to two different servers in a very short interval of time, it is possible that certain messages could be considered to only be valid based upon what was the last message received on the local server. If a message appears to be out of sequence, then a return message could be sent to have the customer try their message again in a few moments or type something like "RESET" to start the process over again.

As described above, if the customer types "YES" to confirm their order, it is also possible to require a specific random text sequence to ensure that it is a confirmation response to the last message sent, as "YES" could be a fairly generic response, and if two messages got lost or out of sequence, then they could be agreeing to something different than what was last sent to them to confirm.

Furthermore, the sparse arrays could also be implemented as a high performance system on Oracle or any other database. The data could be sequentially stored and cross-indexed a variety of ways without causing any heavy burden on the database or require too much data storage.

In more technical detail, a QuikOrder (QO) Station is provided to help implement the above-described system. In an preferred embodiment, the QO Station is a Windows service written in VB.NET that runs on location of a product or service provider.

When the QO Station starts, it authenticates itself with the QuikOrder® server. After authentication, QO Station queries the server via HTTP at a configurable interval to see if there are any edicts. If any edicts are waiting, the QO Station immediately places a second query via HTTPS that retrieves the data necessary to carry out the command.

After retrieving the edict data, the QO Station takes action and notifies the server if the action was successful. An exemplary cycle is described as follows:

QO Station starts up and authenticates;
QO Station queries the QuikOrder® server for an edict via HTTP, but there is none;
QO Station sleeps for 15 seconds;
QO Station queries the server for an edict via HTTP, and the server replies there is an order to be retrieved;

QO Station retrieves the order information via HTTPS, saves the order, and then notifies the server that the order was saved.

Since the QO Station runs in the store and polls, it's model offers a higher degree of network security than an in-store listener model that receives requests because a listener model requires one or more ports to be opened on the firewall to receive the requests, but the QO Station polling model can run behind a firewall and NAT, and sensitive data can be retrieved via HTTPS.

When QO Station processes a retrieved message, it will be able to do one of the following:
- forward the message to an in-store listener;
- insert records into a MSDE database;
- print text to an in-store printer;
- write text to a ASCII file;

The message processing options in the QO Station are generic and configurable. This allows the QuikOrder® server to interface with multiple vendors without changing the QO Station service. Additional message processing options can be added at a later date, if needed, and the version incremented. Vendor-specific details can be handled at the application level in a high-speed cache using a plug-in/modular model. This allows the server a high degree of flexibility when changes are required for existing vendors, or when the server interfaces with new vendors.

New vendors/product/service providers can receive a standard QO Station service install. Depending on the vendor's requirements, they will use an existing or new extraction module, and they will use an existing or new formatter. Examples are illustrated as follows:

A vendor has their own order receiver. The QuikOrder® server sends the vendor the QO Station install package. QuikOrder® evaluates what information is required by the vendor to submit an order. QuikOrder® uses an existing extraction module or the vendor (or system provider) writes a custom module to extract the required data from the database. QuikOrder® uses an existing formatter or the vendor (or system provider) writes a new formatter to submit the order information in the vendor's format (this will be custom for each vendor).

A vendor retrieves orders from, e.g., an MSDE database. QuikOrder® sends the vendor the QO Station install package. QuikOrder® evaluates what information is required by the vendor to submit an order. QuikOrder® writes code to extract the required data from a data structure. QuikOrder® writes code to submit the order information into MSDE.

A restaurant has orders print to an in-store printer. QuikOrder® sends the vendor the QO Station install package. QuikOrder® evaluates what information is required by the restaurant to submit an order. QuikOrder® writes code to extract the required data from the web order data structure. QuikOrder® writes code to submit the order information to the restaurant's printer.

A vendor retrieves orders from ASCII text files. QuikOrder® sends the vendor the QO Station install package. QuikOrder® evaluates what information is required by the vendor to submit an order. QuikOrder® writes code to extract the required data from the web order data structure. QuikOrder® writes code to submit the order information into an ASCII text file.

In sum, the functions of the QO Station can include:
- QO Station authenticates with QuikOrder website;
- QO Station queries the QuikOrder website to see if messages are pending;
- QO Station queries the QuikOrder website to retrieve pending messages;
- QO Station forwards orders to an in-store receipt printer;
- Installation versioning and message versioning;
- QO Station pulls information via HTTPS;
- QO Station inserts orders into an MSDE database;
- QO Station relays orders to another in-store listener;
- QO Station writes order details to an ASCII text file;
- QO Station prints orders to an in-store Windows printer;
- QO Station notifies in-store personnel to error conditions (i.e., outbound connectivity problems);
- QO personnel retrieves QO Station's configuration data;
- QO personnel sends QO Station new configuration details;
- QO Station acknowledges messages received from QuikOrder;
- User interface provides virtual POS order processing; and
- QO Station writes order details to an ASCII text file;
- (alternate vendor formats are accommodated).

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A method for ordering a product or service from a vendor, comprising:
providing a server located remotely from a customer with information related to the customer;

sending, by the customer to the server, via a portable communications device, a directive related to an order for the product or service in an abbreviated coded or tokenized format using a stateless communications protocol;

performing, by the server, a context-based interpretation of the directive and associating the directive with either a new or currently pending order;

associating the coded directive with a command and performing the command, wherein if an ambiguity exists with the coded directive, the server sends a message to the customer requesting resolution of the ambiguity; and sequencing multiple communications received from the customer, and providing responses associated with the correct directive from the customer.

2. The method according to claim 1, further comprising:
defining, by the customer, a tokenized directive on the server that defines an operation to be repeated relating to ordering the product or service; and
subsequently sending this tokenized directive to the server.

3. The method according to claim 2, wherein the operation to be repeated comprises information on payment and delivery of the ordered product or service.

4. The method according to claim 2, wherein the operation to be repeated comprises authorized phone numbers that can implement the operation to be repeated.

5. The method according to claim 4, wherein the operation to be repeated further comprises a PIN number associated with the authorized phone numbers.

6. The method according to claim 1, wherein the information related to the customer comprises a telephone number, a name, address information, and credit card information.

7. The method according to claim 1, wherein the providing of the customer information is performed by filling in an electronic form by the customer.

8. The method according to claim 1, further comprising:
logging into one or more messaging service by the server;
identifying incoming messages or directives by their service and account code; and
consolidating orders for the customer by utilizing a cross-referenced list that is maintained.

9. The method according to claim 1, wherein the tokenized directive comprises two or more of designations selected from the group consisting of: alphanumeric, position, sequence, unique, content, case, default, specials, and preferences.

10. The method according to claim 1, wherein the tokenized directive utilizes combinations of positional or case and character restrictions.

11. The method according to claim 1, wherein certain directives are defined by single numbers or single characters preceded by a special designation.

12. The method according to claim 11, further comprising:
deriving, by the server, a delivery address for delivery of the ordered product or service from a GPS feature of the portable communications device.

13. The method according to claim 1, further comprising:
requesting confirmation via a transaction to the customer.

14. The method according to claim 13, wherein the confirmation request requests that the customer utilize an order-unique reply code, and the customer utilizes the order-unique reply code in a confirmation response.

15. The method according to claim 1, wherein the stateless communication protocol is selected from the group consisting of a text messaging protocol, a wireless application protocol (WAP), and a web protocol implemented on a web browser or web-enabled phone browser.

16. The method according to claim 15, wherein the stateless communication protocol is SMS.

17. The method according to claim 1, further comprising:
cross-referencing information in an other database to obtain some or all of the customer information for customers that have not pre-registered.

18. The method according to claim 1, further comprising:
pre-registering to provide the customer information via a web site or through SMS messaging.

19. The method according to claim 1, further comprising:
validating an order based on a telephone number of the customer.

20. The method according to claim 1, further comprising:
associating, by the customer, valid delivery addresses for delivery of purchased product or service for one or more telephone numbers.

21. The method according to claim 1, further comprising:
utilizing a sparse array database for the performing of the context-based interpretation, the associating of the coded directive, and the sequencing of multiple communications.

22. The method according to claim 1, further comprising:
time stamping the directives received via stateless communication and adding a tie-breaker indicator to the directives.

23. The method according to claim 22, further comprising:
creating the added tie-breaker value by searching previous directives having a same time stamp and incrementing a counter value based on a highest tie-breaker indicator for a directive having the same time stamp.

24. The method according to claim 1, further comprising:
determining, by the server, if an ambiguity exists in the tokenized directive by comparing it to values in stored lists, and if a unique value is found, then performing the interpretation of the directive, and if not, querying the customer to resolve the ambiguity.

25. The method according to claim 1, further comprising:
providing multiple short versions of tokenized directives or T9/ABC alternatives for long-version directives or orders.

26. The method according to claim 1, further comprising:
implementing a customer-initiated status request directive by the server.

27. The method according to claim 1, further comprising:
sending a help request to the server by the customer requesting assistance for product or service ordering directives; and
receiving the requested help request by the customer from the server.

28. The method according to claim 27, wherein the help request is selected from the group consisting of a find request, an order request, a list request, a status request, and a help on help request.

29. The method according to claim 1, further comprising utilizing single character tokenized directives for specials.

30. The method according to claim 1, further comprising:
entering, on the server, customer-supplied coded directives and associating, by the customer, respective commands relating to the ordering of the product or service for delivery to the customer-supplied coded directives.

31. The method according to claim 1, further comprising:
running a second parallel process to detect logic loops or other error conditions created by invalid directives or combinations of directives; and
sending an alert if such conditions are detected.

32. The method according to claim 1, further comprising:
providing an algorithm that prevents a single character entry on the server from being used by an additional command.

* * * * *